(12) United States Patent
Srivastava

(10) Patent No.: US 10,489,272 B2
(45) Date of Patent: Nov. 26, 2019

(54) AUTOMATIC INSTRUMENTATION OF CODE

(71) Applicant: The Bank of New York Mellon, New York, NY (US)

(72) Inventor: Kumar S. Srivastava, Mountain View, CA (US)

(73) Assignee: The Bank of New York Mellon, New York, NY (US)

( * ) Notice: Subject to any disclaimer, the term of this patent is extended or adjusted under 35 U.S.C. 154(b) by 31 days.

(21) Appl. No.: 15/868,833

(22) Filed: Jan. 11, 2018

(65) Prior Publication Data

US 2018/0196735 A1 Jul. 12, 2018

Related U.S. Application Data

(60) Provisional application No. 62/445,161, filed on Jan. 11, 2017.

(51) Int. Cl.
*G06F 9/44* (2018.01)
*G06F 11/36* (2006.01)

(52) U.S. Cl.
CPC ...... *G06F 11/3624* (2013.01); *G06F 11/3644* (2013.01)

(58) Field of Classification Search
None
See application file for complete search history.

(56) References Cited

U.S. PATENT DOCUMENTS

| | | | | |
|---|---|---|---|---|
| 6,983,458 B1* | 1/2006 | Honda | ............ | G06F 8/4434 717/136 |
| 2005/0102656 A1* | 5/2005 | Viehland | ............ | G06F 11/3644 717/130 |
| 2007/0180439 A1* | 8/2007 | Sundararajan | ...... | G06F 11/3644 717/158 |
| 2008/0189687 A1* | 8/2008 | Levine | ............ | G06F 11/3636 717/128 |
| 2009/0083714 A1* | 3/2009 | Kiciman | ............ | G06F 8/658 717/128 |
| 2010/0031241 A1* | 2/2010 | Schwartz | ............ | G06F 8/456 717/149 |
| 2012/0079460 A1* | 3/2012 | Cho | ............ | G06F 8/443 717/130 |
| 2012/0151453 A1* | 6/2012 | Finking | ............ | G06F 11/3612 717/130 |
| 2012/0167057 A1* | 6/2012 | Schmich | ............ | G06F 11/3644 717/130 |
| 2012/0331448 A1* | 12/2012 | Tanaka | ............ | G06F 11/3676 717/127 |

(Continued)

*Primary Examiner* — Insun Kang
(74) *Attorney, Agent, or Firm* — Fenwick & West LLP

(57) ABSTRACT

A code repository receives and analyzes changed code to determine whether and how to automatically instrument the code. The code repository identifies locations within the code, such as locations next to external function calls, to insert instrumentation markers. The code repository determines the information to be collected at the location. Redundant information or information that can be derived from other collected information need not be collected. When the instrumented code is executed, the execution of instrumentation markers causes the collection of information. The subsets of information can be used to troubleshoot the code.

18 Claims, 4 Drawing Sheets

(56) References Cited

U.S. PATENT DOCUMENTS

| | | | |
|---|---|---|---|
| 2013/0152044 A1* | 6/2013 | Salecker | G06F 8/70 717/120 |
| 2015/0248343 A1* | 9/2015 | Ionescu | G06F 8/70 717/130 |
| 2016/0041894 A1* | 2/2016 | Reid, III | G06F 11/3636 714/45 |
| 2016/0179475 A1* | 6/2016 | Velummylum | G06F 8/65 717/106 |
| 2016/0202960 A1* | 7/2016 | Minh Le | G06F 11/3624 |
| 2017/0277893 A1* | 9/2017 | Goel | H04L 63/1425 |
| 2017/0286262 A1* | 10/2017 | Hejlsberg | G06F 11/302 |
| 2018/0089422 A1* | 3/2018 | Kounavis | G06F 21/563 |
| 2018/0107821 A1* | 4/2018 | Eshkenazi | G06F 21/51 |
| 2018/0260304 A1* | 9/2018 | Matousek | G06F 11/3644 |

\* cited by examiner

AUTOMATIC INSTRUMENTATION OF CODE

CROSS-REFERENCE TO RELATED APPLICATION

This application claims the benefit of U.S. Provisional Application No. 62/445,161, filed Jan. 11, 2017. The content of the above referenced application is incorporated by reference in its entirety.

BACKGROUND

This disclosure generally relates to computer programming and debugging, and more specifically to the automated instrumentation of computer program code.

A developer who writes a software application can instrument the software code to collect and report certain information during the code's execution. Generally, the developer chooses where to place instrumentation within the code. Furthermore, the developer can specify what information is to be collected and reported through the instrumentation.

In many scenarios, a developer may not be in a position to decide where best to instrument the code and what information to collect through the instrumentation. As such, an analyst analyzing the execution of the software code at a subsequent time point may not have the most relevant data. For example, the analyst may find that there are gaps in the instrumentation of the code because it did not occur to the developer to instrument at those locations at the time of code development. Accordingly, it becomes difficult for the analyst to perform certain tasks such as debugging or troubleshooting the application.

SUMMARY

A code repository automatically analyzes code, determines where to insert instrumentation markers within the code, and determines what information to collect at each instrumentation marker of the code. The instrumentation decisions are thus removed from the developer. The automated method of instrumenting the code is performed such that the amount of information collected when executing the instrumented code is reduced while maintaining the utility of the collected information. In other words, the collected information generated by executing the instrumented code can be used to debug or troubleshoot the instrumented code while also consuming fewer computational resources (e.g., computer memory and storage) in comparison to information collected from instrumented code generated through conventional methods.

A code repository can receive code from a client device operated by a code developer. In various embodiments, the code repository determines an extent of change of the code to determine whether the code warrants instrumentation. The code repository can choose to forego instrumentation if the extent of change is small. Conversely, the code repository can proceed with instrumenting the code when significant changes to the code occur. To instrument the code, the code repository identifies instrumentation locations within the code for insertion of instrumentation markers. In some embodiments, the code repository identifies instrumentation locations in the code where function calls occur. Thus, information collected when the instrumented code is executed enables an analyst to understand whether function calls were properly performed in the instrumented code.

At each identified instrumentation location within the code, the code repository determines what elements of information to collect at the instrumentation location. Specifically, the code repository identifies a first subset of elements at the instrumentation location that is to be collected and a second subset of elements that need not be collected. The first subset of elements includes non-redundant information that has not previously been collected and furthermore, cannot be readily derived from previously collected information. Conversely, the second subset of elements can consist of previously collected redundant information or information that can be derived from previously collected information. Therefore, the second subset of elements do not need to be collected at that location in the code.

The code repository inserts an instrumentation marker at each instrumentation location that specifies the collection of the first subset of elements of information at the instrumentation location. The instrumented code can be stored. When the instrumented code is retrieved and executed, the execution of the instrumented portions of the instrumented code causes the collection of data values corresponding to the first subset of elements of information at each instrumentation location. The collected data values can be used by an analyst to troubleshoot the code.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Overall System Environment

Figure 1:
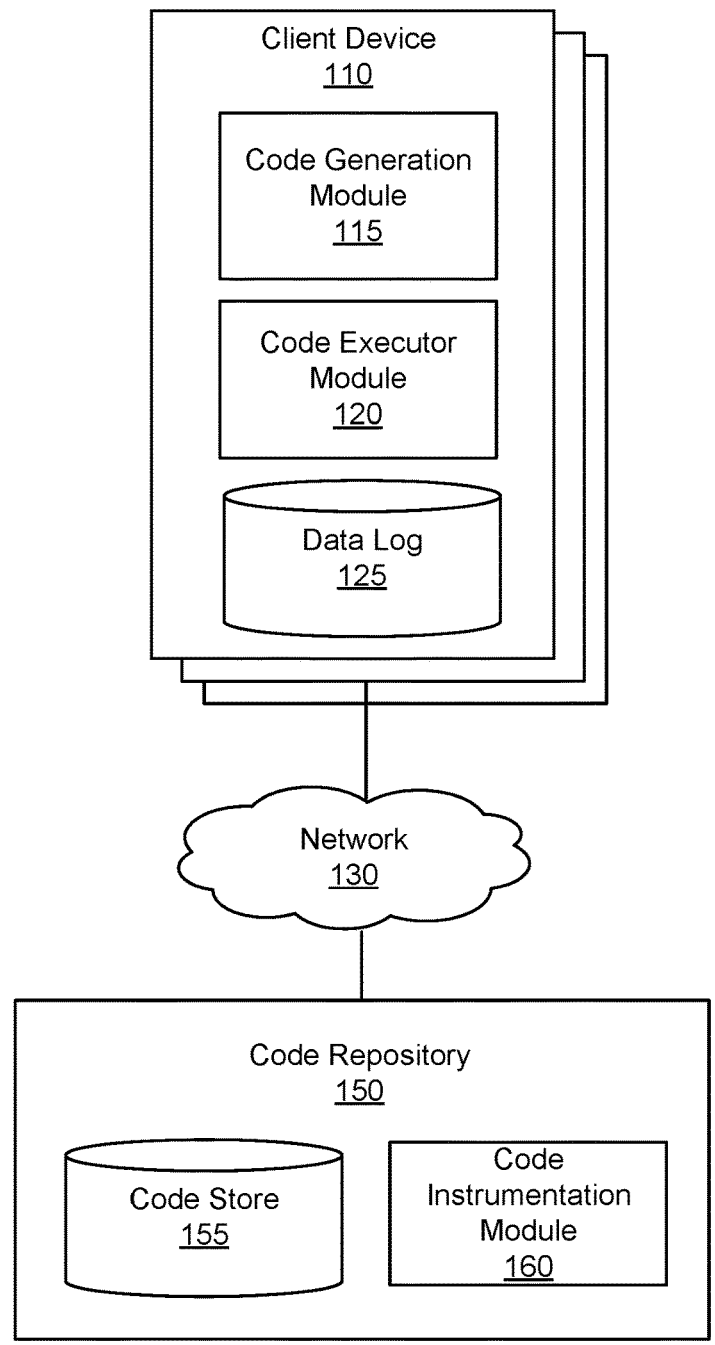
FIG. 1 depicts an overall system environment for the automated instrumentation of code, in accordance with an embodiment.

FIG. 1 depicts an overall system environment 100 for the automated instrumentation of code, in accordance with an embodiment. The overall system environment 100 can include a code repository 150 and multiple client devices 110 that are each in communication with the code repository 150 through a network 130. Although FIG. 1 depicts three client devices 110, in various embodiments, there may be additional or fewer client devices 110 that each interact with the code repository 150 through the network 130.

In some embodiments, the client devices 110 and the code repository 150 may be differently arranged than as shown in FIG. 1. In one embodiment, there may be multiple code repositories 150, each code repository 150 residing on one of the client devices 110. For example, a code repository 150 may be a local software application executing on a client device 110. Therefore, in these embodiments, the processes described herein performed by the code repository 150 can be performed on the client device 110.

A client device 110 generates code that is transmitted and stored in the code repository 150. The code repository 150 continually monitors for code from each of the client devices 110. Upon detection of a change in code, which can be the receipt of new code or an update to currently existing code in the code repository 150, the code repository 150 performs an analysis to determine whether to instrument the changed code. If the code repository 150 chooses to instrument the code, the code repository 150 identifies instrumentation locations within the code. The processes performed by the code repository 150 is described in further detail below. Each instrumentation location represents a location in the code for the subsequent placement of an instrumentation marker, which, when the instrumented code is executed, causes the collection of particular elements of information that can be used for subsequent code debugging and troubleshooting.

A client device 110 can be embodied as an electronic device. For example, the client device 110 can be a personal computer (PC), a desktop computer, a laptop computer, a notebook, a tablet PC executing an operating system, for example, a Microsoft Windows-compatible operating system (OS), Apple OS X, and/or a Linux distribution. The client device 110 includes computer hardware such as a processor, input devices (e.g., mouse, keyboard, touch display), memory, and the like.

As shown in FIG. 1, each client device 110 includes a code generation module 115 and a code executor module 120. Although the client device 110 shown in FIG. 1 includes both a code generation module 115 and a code executor module 120, in other embodiments, the client device 110 can include additional or fewer modules. For example, a client device 110 may include a code generation module 115 but may not include a code executor module 120. As another example, a client device 110 may include a code executor module 120 but not a code generation module 115.

The code generation module 115 generates code in response to user input from a user, such as a code developer. In various embodiments, the code generation module 115 generates code using one of a variety of programming languages including Java, Python, C, C++, Ruby, PHP, or Swift. The code generated by the code generation module 115 can be source code. In one embodiment, the code generation module 115 communicates with the one or more input devices (e.g., a mouse, keyboard, display) of the client device 110 through which a user provides user inputs. The code generation module 115 generates the code in response to the provided user inputs. In various embodiments, the code generation module 115 provides a development environment that enables the developer to perform tasks for developing code. For example, the code generation module 115 can be a software application executing on the client device 110 that provides an interface for the developer to write code. The code generation module 115 transmits the generated code to the code repository 150 for automated instrumentation.

The code executor module 120 executes code, such as instrumented code, which causes execution of the instrumented portions of the code. As a result of executing the instrumented code, the code executor module 120 obtains data values corresponding to a subset of elements of information specified by instrumentation markers located in the instrumented code. The code executor module 120 logs the subset of elements of information in the data log 125. The collected subset of elements of information can be informative for subsequent debugging and troubleshooting of the code. As an example, the subset of elements of information collected and stored by the code executor module 120 can include data values corresponding to parameters of a function call in the instrumented code, such as the input parameters or the output parameters of the function call.

In some embodiments, prior to executing instrumented code, the code executor module 120 can process the instrumented code to enable its execution. For example, if the instrumented code is expressed as source code, the code executor module 120 can perform a transformation, such as a compilation process, on the instrumented code to generate machine code that can be executed.

In various embodiments, the code generation module 115 generates code and the code executor module 120 executes an instrumented version of the code generated by the code generation module 115. In other embodiments, the code generated by the code generation module 115 and instrumented code executed by the code executor module 120 may be unrelated. In other words, the same code need not be generated and executed on the same client device 110. A code generation module 115 of a first client device 110 can generate code and a code executor module 120 of a second client device 110 can execute an instrumented version of the generated code.

The code repository 150 receives code and automatically instruments the received code. As shown in FIG. 1, the code repository 150 includes a code store 155 and a code instrumentation module 160.

The code store 155 receives and stores code. In one embodiment, the code store 155 stores code generated by the client device 110. In one embodiment, the code store 155 stores instrumented code. In some embodiments, the code store 155 stores code from the client device 110 and instrumented code generated by instrumenting the code from the client device 110.

The code instrumentation module 160 automatically instruments code stored in the code store 155. For example, the code instrumentation module 160 retrieves and automatically instruments code received from a client device 110. The code instrumentation module 160 identifies instrumentation locations within the code, determines a subset of elements of information that is to be collected at each instrumentation location, and inserts instrumentation markers at each instrumentation location. Each instrumentation marker specifies the collection of data values of the determined subset of elements of information that is to be collected at the corresponding instrumentation location. The analysis performed by the code instrumentation module 160 is described in further detail below in relation to the individual modules of the code instrumentation module 160 shown in FIG. 2.

For each instrumentation location, the code instrumentation module 160 analyzes elements of information associated with the instrumentation location to determine different subsets of the elements of information. In various embodiments, the code instrumentation module 160 determines a first subset of elements of information and a second subset of elements of information at each instrumentation location.

A first subset of elements of information includes non-redundant elements of information. Non-redundant elements of information include elements that have not previously been specified as an element in a first subset at a prior instrumentation location. In various embodiments, a first subset of elements of information includes non-derivable elements that cannot be derived from elements in a first subset at prior instrumentation locations. In various embodiments, a first subset of elements of information of an instrumentation location includes elements that are both non-redundant and non-derivable.

A second subset of elements of information includes redundant elements of information that have previously been specified as an element in a first subset at a prior instrumentation location. In various embodiments, the second subset of elements of information includes derivable elements of information that can be derived from elements in a first subset at prior instrumentation locations. In various embodiments, the second subset of elements of information for an instrumentation location includes elements that are both redundant and derivable.

The code instrumentation module 160 inserts an instrumentation marker at the instrumentation location that specifies only the collection of data values corresponding to the first subset of elements of information for the instrumentation location and not the second subset of elements of information for the instrumentation location. Therefore, when the instrumented code is executed, each instrumentation marker causes the collection of solely data values corresponding to the first subset of elements of information specified by the instrumentation marker. The collected data values can be used to troubleshoot the instrumented code. In some embodiments, the collected data values corresponding to the first subset of elements can be used to derive other information, such as the second subset of elements, that can further be used to troubleshoot the instrumented code.

Altogether, the code instrumentation module 160 automatically performs the instrumentation of code in the code store 155, without necessarily relying on developer input, which leads to more efficient code development. Additionally, by instrumenting the code to only collect data values corresponding to a subset of elements of information (e.g., a first subset), information is more efficiently collected and stored for purposes of code debugging.

In some embodiments, the code repository 150 is formed of one or more electronic devices. In some embodiments, the code repository 150 is a software application executing on an electronic device, such as a client device 110. In some embodiments, the code repository 150 can be embodied as a cloud server or rack server. In other words, the functions and algorithms performed by the code repository 150 can be distributed across multiple processors and/or electronic devices. In some embodiments, the one or more processors or electronic devices may be located in a single geographic location (e.g., within a home environment, an office environment, or a server farm). In other example embodiments, the one or more processors or electronic devices may be distributed across a number of geographic locations.

In various embodiments, the network 130 facilitates communications between the one or more client devices 110 and the code repository 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Figure 2:
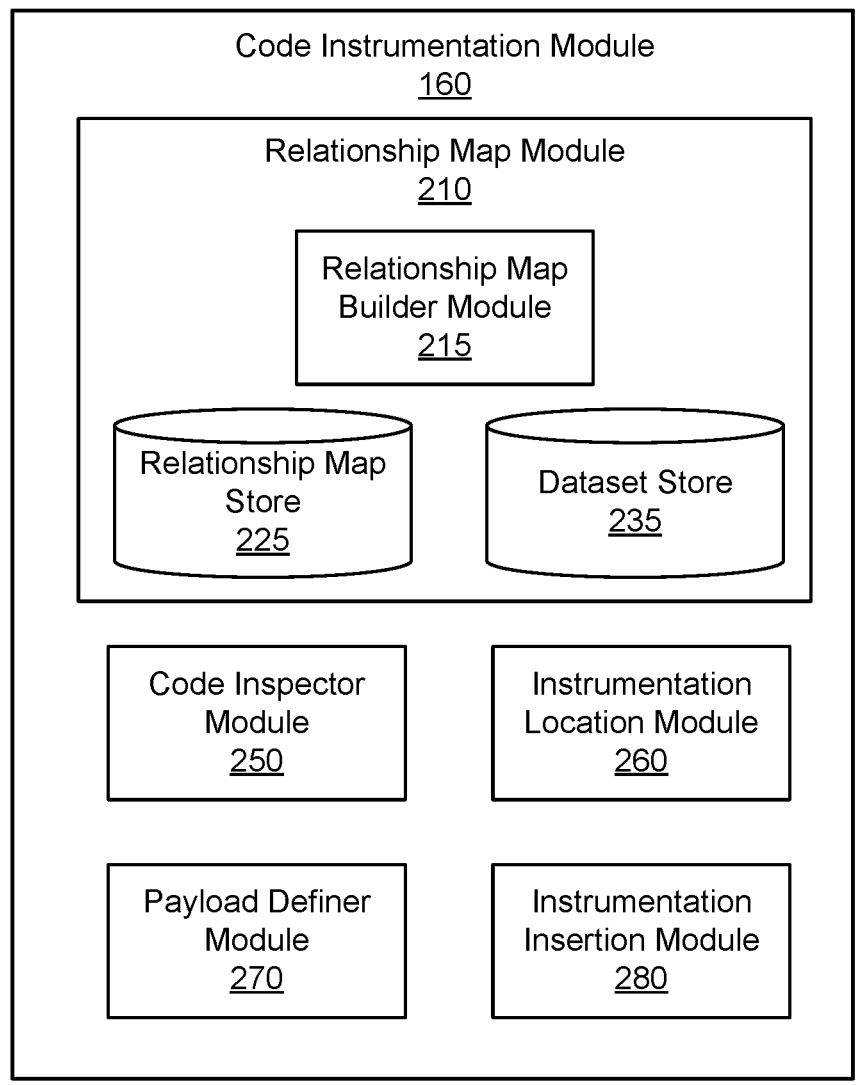
FIG. 2 depicts a block diagram architecture of the code instrumentation module of the code repository, in accordance with an embodiment.

Reference is now made to FIG. 2, which depicts a block diagram architecture of the code instrumentation module 160 of the code repository 150, in accordance with an embodiment. The code instrumentation module 160 includes a relationship map module 210, a code inspector module 250, an instrumentation location module 260, a payload definer module 270, and an instrumentation insertion module 280. In other embodiments, the code instrumentation module 160 may include additional, fewer, or different modules. In addition, the functionality attributed to specific modules herein may be performed by other modules in other embodiments.

The relationship map module 210 maintains relationship maps for the code repository 150 that describes relationships between different elements of information based on data values stored in datasets in the dataset store 235. As described below in further detail, a relationship map can be used for determining data values corresponding to the first subset of information to be collected at an instrumentation point. As shown in FIG. 2, the relationship map module 210 includes a relationship map builder module 215, a relationship map store 225, and a dataset store 235.

Referring first to the dataset store 235, it may hold datasets that include data values. Datasets may be provided by client devices 110. In various embodiments, datasets can be provided by third party systems that are associated with the code repository 150. As an example, the relationship map module 210 may receive or gain access to databases maintained by an enterprise, such as a bank or consulting firm. Therefore, the relationship map module 210 may access datasets, such as transactional datasets, from a third party system that are available in the dataset store 235. The dataset store 235 can be maintained and continuously updated as datasets are newly added or updated.

In various embodiments, a dataset includes data values that are structured in the dataset such that the organization of the data values indicate relationships between the data values. For example, data values may be organized in columns or rows of the dataset. As a specific example, a first column of a dataset can include data values that include "John Smith" and "Jane Doe," and the second column of the dataset includes the data values of "123-45-6789" and "987-65-4321". Here, the data values in the first column, which are each a user name data value type, are related to data values in the second column, which are each a social security number data value type. For example, each social security number in the second column of the dataset can be assigned to a user name in the first column of the dataset.

The relationship map builder module 215 builds and maintains relationship maps by analyzing data values in the datasets stored in the dataset store 235. In one embodiment, the relationship map builder module 215 generates relationships in the relationship map to indicate that a relationship exists between two elements of information in a dataset of the dataset store 235. In various embodiments, the relationship map indicates relationships between a particular element of information, such as a data value type, based on data values in datasets in the dataset store 235. Here, the relationship map builder module 215 may process the different data values in the datasets to determine the data value type for different data values.

In various embodiments, to determine the data value type for a data value, the relationship map builder module 215 performs a pattern recognition analysis on each data value. By performing a pattern recognition of the data value, the relationship map builder module 215 determines a regular expression of the data value. A regular expression can be any pattern in the data value such as a space between two strings (e.g., for a name), 9 total digits separated by hyphens (e.g., for a social security number), or 15 to 16 numerical digits (e.g., for a credit card number). Based on the determined regular expression of data values in the dataset, the relationship map builder module 215 can determine the data value types in the dataset for the purposes of establishing relationships between the data value types in the relationship map. Returning to the above example, if a first column of a dataset includes data values that include "John Smith" and "Jane Doe," and the second column of the dataset includes the data values of "123-45-6789" and "987-65-4321", then the relationship map builder module 215 can perform a pattern analysis on the data values in the first column and second column to determine a data value type of each column. Here, the relationship builder module 215 determines that the first column of the dataset includes a user name data value type and that the second column includes a social security number data value type. Therefore, the relationship map builder module 215 establishes a relationship in the relationship map between the user name data value type and the social security number data value type.

In various embodiments, having identified relationships between elements of information, the relationship map builder module 215 assigns a hierarchy level to each element of information in the relationship map based on the identified relationships. In one embodiment, the relationship map builder module 215 assigns a hierarchy level to an element of information based on how many relationships the element of information has with additional elements of information in the relationship map. In one embodiment, the relationship map builder module 215 assigns a hierarchy level to an element of information if the element of information has greater than a threshold number of relationships with additional elements of information in the relationship map. In one embodiment, the relationship map builder module 215 assigns a hierarchy level by ranking the number of relationships that each element of information has in the relationship map. For example, the relationship map builder module 215 ranks the elements of information in a relationship map and assigns a level 1 hierarchy to the highest ranked element of information, a level 2 hierarchy to the second highest ranked element of information, and so on.

The relationship map store 225 stores relationship maps generated by the relationship map builder module 215. Each relationship map describe relationships between elements of information. In one embodiment, an element of information within a relationship map is a data value type of a data value in a dataset stored in the dataset store 235.

A relationship map store can describe a hierarchy of the elements of information in addition to the relationships between elements of information. For example, a first element of information and a second element of information may have a relationship with one another as indicated in the relationship map. Additionally, a first element of information may be assigned a level 1 hierarchy whereas a second element of information may be assigned a level 2 hierarchy. In various embodiments, an element of information assigned a higher hierarchy level has more relationships with other elements of information in the relationship map in comparison to an element of information assigned a lower hierarchy rank.

The code inspector module 250 monitors the code store 155 to detect changes to code stored in the code store 155. If a change to code in the code store is detected, the code inspector module 250 evaluates the change to the code to determine whether automated instrumentation of code is to be performed. A change to code in the code store 155 can be the addition of newly generated code provided by the client device 110 or an update to already existing code. Other examples of changes to code in the code store 155 can be the addition of a new user (e.g., developer) to a project or the creation or updating of a directory or library in the code store 155.

When a change to code is detected, code inspector module 250 determines the extent of the change to the code. In various embodiments, if the extent of change to code is large, the code inspector module 250 proceeds with instrumenting the code whereas if the extent of change is small, the code inspector module 250 can forego instrumentation of the code.

To determine an extent of change of the code, the code inspector module 250 compares the detected changed code to a prior version of the code. By doing so, the code inspector module 250 determines what has changed between the detected changed code and the prior version of the code. In one embodiment, the changed code is a newly added code and therefore, the prior version of the code is a non-existent version of the code.

In one embodiment, the code inspector module 250 determines code features of the code, where each code feature can represent a measure of the amount of change between the detected changed code and the prior version of the code. For example, code features can be a total number of added lines of code, a total number of changes to existing lines of code, a type of function call newly added or updated in the code, the number of function calls added or changed in the code, or a number of users added or modified.

In one embodiment, the code inspector module 250 determines whether the identified code feature is a trigger code feature. Upon detection of a trigger code feature, instrumentation of the code can be performed irrespective of other detected code features. To determine a trigger code feature, the code inspector module 250 may perform a comparison between a code feature and a threshold value. In one embodiment, if the code feature exceeds the threshold value, the code inspector module 250 deems the code feature as a trigger code feature. As an example, if the code inspector module 250 determines that greater than a threshold number of lines of new code were added to the code store 155, then the code is to be instrumented. Thus, the code inspector module 250 ensures that large changes to code in the code store 155 are automatically instrumented. Conversely, if fewer than a threshold number of lines of code were added or updated, instrumentation of the code is not warranted. In another embodiment, if the code inspector module 250 identifies a function call in the changed code that references an external location, such as an external library or external directory, the code inspector module 250 deems the external function call as a trigger code feature.

In one embodiment, the code inspector module 250 determines a change score that represents the extent of the change. The code inspector module 250 can calculate a change score based on the combination of determined code features. Therefore, the code inspector module 250 chooses whether to instrument code based on the determined change score. As one example, the change score can be the weighted sum of the code features. If the change score is above a threshold score, the code inspector module 250 performs instrumentation of new or updated code in the code store 155. If the code inspector module 250 determines that the change score is below a threshold score, the code inspector module 250 may refrain from instrumenting the code.

If the changed code is to be instrumented, the instrumentation location module 260 identifies instrumentation locations within the changed code. Each instrumentation location is a location within the code where an instrumentation marker can be placed for logging of information. The logged information can then be informative for subsequent debugging and troubleshooting of the code.

In one embodiment, the instrumentation location module 260 identifies instrumentation locations within the code that are locations relevant to function calls in the code. For example, if an external function call is detected in the changed code, the instrumentation location module 260 identifies an instrumentation location within the code that is adjacent to the external function call. In one embodiment, the instrumentation location module 260 identifies a first instrumentation location immediately prior to the external function call and a second instrumentation location immediately after the external function call. This ensures that the instrumented code, when executed, outputs information at locations next to the external function call such that an analyst can readily understand whether the external function call was appropriately executed.

As another example, if the code feature is the total number of lines of newly added code, the instrumentation location module 260 identifies instrumentation locations that are dispersed across the total number of lines of newly added code. Such dispersed instrumentation locations can be selected based on the locations of function calls across the lines of newly added code. In one embodiment, the instrumentation location module 260 identifies instrumentation locations that are uniformly dispersed across the lines of newly added code. For example, the instrumentation location module 260 identifies instrumentation locations at every X number of lines of code, where X can be a pre-determined value provided by a developer or a default value. This ensures that the instrumented code, when executed, causes the collection of information at locations across the code so that an analyst can readily localize a location in the code that needs troubleshooting.

The payload definer module 270 analyzes each instrumentation location identified by the instrumentation location module 260 to determine data values of a first subset of elements of information, also referred to as identifiers, that are to be collected at the instrumentation location when the code is executed. Generally, the payload definer module 270 determines identifiers of each instrumentation location with the goal of minimizing the amount of data that is collected when the instrumented code is executed without sacrificing the utility of the collected information. Therefore, fewer computational resources (e.g., computational memory and storage) are consumed for the purposes of collecting information that can subsequently be used for debugging purposes.

Each instrumentation location is associated with various elements of information that are relevant for the instrumentation location. Each element of information can be a data value type, a parameter, or context information. A type of data value can be a categorization of a data value. For example, if the data value is "John Smith," then the data value type can be a "user name." Additionally, if the data value is "123-45-6789" then the data value type can be a "social security number." A parameter can serve as an input to a function call that is immediately after the instrumentation location or serve as an output from a function call that immediately precedes the instrumentation location. Examples of context information can include an internet protocol (IP) address of a device that executes an instrumentation marker at the instrumentation location, device information (e.g., operating system), time and date corresponding to when the instrumentation marker at the instrumentation location is executed, a line number of the instrumentation location, a name of a developer, and the like.

The payload definer module 270 identifies and analyzes the elements of information associated with each instrumentation location to determine identifiers of the instrumentation location. In various embodiments, the payload definer module 270 performs two analyses to determine identifiers of the instrumentation location. The payload definer module 270 performs an analysis to identify whether an element of information is a redundant element or non-redundant element of the instrumentation location. In various embodiments, a redundant element is categorized as a descriptor and the payload definer module 270 need not perform the second analysis on the redundant element. If the element is a non-redundant element, the payload definer module 270 performs an analysis to identify whether the element of information can be derived from prior elements, such as elements at prior instrumentation locations. If an element of information can be derived from prior elements, then the payload definer module 270 categorizes the element as a descriptor. Generally, the payload definer module 270 categorizes an element of information that is both non-redundant and not derivable from prior elements as an identifier. To provide an example, parameters of function calls can often change from one instrumentation location to another and additionally may not be derivable from prior identifiers at previous instrumentation locations. Thus, parameters of function calls can often be categorized as identifiers.

To identify elements of information that are redundant, the payload definer module 270 analyzes elements of information in view of elements that have been identified for collection at prior instrumentation locations. Specifically, the payload definer module 270 performs a comparison between elements at the instrumentation location and elements at prior instrumentation locations. If the element at the instrumentation location was previously identified for collection (e.g. is an identifier) at a prior instrumentation location, the payload definer module 270 can deem the element as a redundant element and automatically categorize the element as a descriptor (e.g., not to be collected). As an example, elements of information, such as an IP address, will be unlikely to change as the code is executed. In some embodiments, the payload definer module 270 can identify the IP address as an identifier for the first instrumentation location and as a redundant element for each of the subsequent instrumentation locations.

To determine whether an element of information can be derived from prior elements, the payload definer module 270 analyzes the element in view of a relationship map retrieved from the relationship map store 225. As stated above, the relationship map describes existing relationships between different elements of information based on data values stored in datasets in the dataset store 235. The payload definer module 270 can determine whether an element of information can be derived from prior elements based on the presence or absence of relationships in the relationship map. If a relationship does not exist between the element of information and any additional element in the relationship map, then the payload definer module 270 determines that the element cannot be derived from other elements. Conversely, if a relationship exists between the element of information and additional elements in the relationship map, the payload definer module 270 determines that the element can be derived from additional elements. Thus, the payload definer module 270 proceeds to determine whether any of the additional elements have previously been categorized as an identifier at either the current instrumentation location or at any previous instrumentation location. If no additional elements have been previously categorized as an identifier, then the element cannot be derived from prior elements. However, if any of the additional elements have previously been categorized as an identifier, then the element need not be additionally collected. Therefore, the payload definer module 270 can label the element as derivable, and furthermore, can deem the element as a descriptor. Following the two analyses, the remaining elements of information that have not been determined to be redundant nor derivable from identifiers of previous instrumentation locations are labeled as identifiers.

In various embodiments, the payload definer module 270 analyzes the elements of information for an instrumentation location in view of the hierarchy levels assigned to elements of information and relationships between elements of information in a relationship map. Specifically, for the elements of information that each have a relationship in the relationship map, the payload definer module 270 selects a subset of the elements of information as identifiers. Each of the elements in the subset are assigned the highest hierarchy levels and can be used to derive the remaining elements of information that have a relationship with elements in the subset. In other words, the payload definer module 270 uses the hierarchy levels in the relationship map to select a fewer number of elements of information that can be used to derive the remaining elements of information at the instrumentation location. As an example, assume that the elements of information include a user name, social security number, and credit card number. Additionally, assume that the user name is assigned a level 1 hierarchy in the relationship map and has a relationship with each of the social security number and credit card number that are each assigned a level 2 hierarchy, then the payload definer module 270 selects the user name as an identifier whereas each of the social security number and credit card number is categorized as descriptors because they are derivable from the user name.

In various embodiments, the payload definer module 270 need not analyze all elements of information at an instrumentation location in view of the hierarchy levels in the relationship map. For example, the payload definer module 270 first performs the analysis described above that identifies elements of information that are redundant elements. These redundant elements are categorized as descriptors. The payload definer module 270 then analyzes the non-redundant elements of information in view of the hierarchy levels assigned to elements of information and relationships between elements of information in a relationship map. Thus, from amongst these non-redundant elements, the payload definer module 270 determines the subset of non-redundant elements to be selected as identifiers based on the hierarchy level assigned to each non-redundant element.

In one embodiment, the payload definer module 270 determines an identifier of the instrumentation location by analyzing the comment stream provided by a developer of the code. For example, the developer can specify particular parameters of a function call. For an instrumentation location next to the function call, the payload definer module 270 performs a comparison to identify the particular parameters of the function call at the instrumentation location that are also specified by the developer's comments. Thus, the payload definer module 270 can deem these parameters of the function call as identifiers of the instrumentation location.

The instrumentation insertion module 280 instruments the code by inserting an instrumentation marker at each instrumentation location identified by the instrumentation location module 260. Each instrumentation marker specifies the collection of data values corresponding to a first subset of elements of information as determined by the payload definer module 270 for the instrumentation location.

As an example, a line of code, prior to instrumentation, can be as follows:
(Line M) (Offer)=Analysis(name, CCN, SSN)
In this example, line M of the code is a function call to the function "Analysis" that takes as input the parameters name, credit card number (CCN), and social security number (SSN) and returns an output parameter of Offer. Here, the instrumentation insertion module 280 may insert an instrumentation marker at a first instrumentation location in the line immediately prior to line M. The first instrumentation marker at the first instrumentation location can specify the logging of data values of identifiers, which, in this example, may include a subset of the input parameters name, CCN, and SSN. As an example, the payload definer module 270 may have determined that the identifier for the first instrumentation location includes the name parameter while parameters CCN and SSN are derivable from the name parameter. Therefore, the instrumentation insertion module 280 can insert a first instrumentation marker such that the code now reads:
(Line M−1) Record (name)
(Line M) (Offer)=Analysis(name, CCN, SSN)
where the code "Record(name)" would cause the collection of the data value corresponding to the parameter name when the instrumented code is executed. The instrumentation insertion module 280 can further insert an instrumentation marker at a second instrumentation location in the line immediately subsequent to line M. Here, the elements of information at the second instrumentation location can include the parameter of Offer. The identifier for the second instrumentation location may be identified as the output parameter Offer. Therefore, the instrumentation insertion module 280 can insert a second instrumentation marker at line M+1 such that the code now reads:
(Line M−1) Record(name)
(Line M) (Offer)=Analysis(name, CCN, SSN)
(Line M+1) Record(Offer)
where the code "Record(Offer)" would cause the collection of the data value corresponding to the parameter Offer when the instrumented code is executed. The instrumentation insertion module 280 stores the instrumented code in the code store 155 for subsequent retrieval by a client device 110. Thus, the instrumented code can be executed and debugged using the identifiers logged when the instrumented portion of the code is executed.

Process for the Automatic Instrumentation of Code

Figure 3:
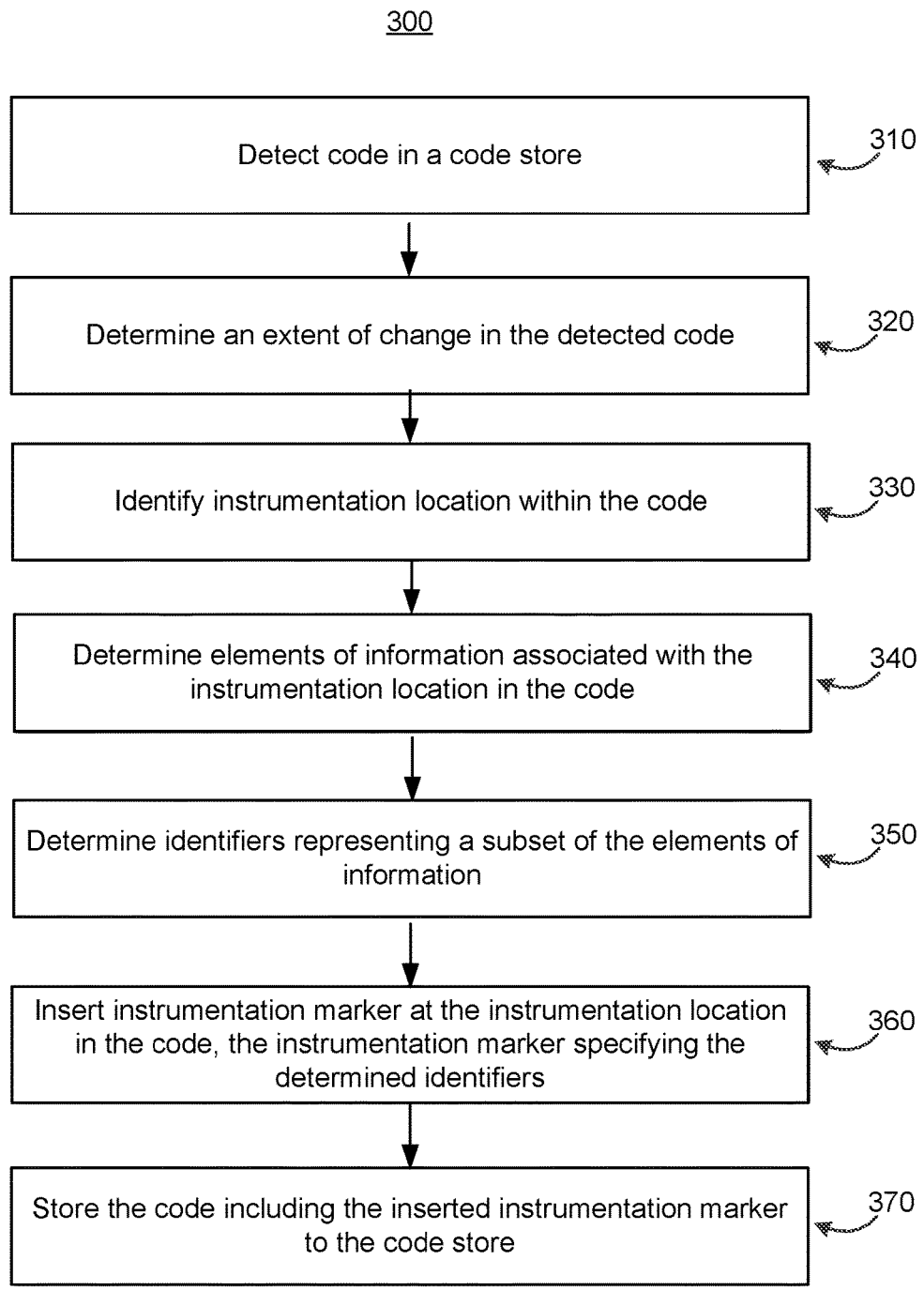
FIG. 3 is a flow process for automatically instrumenting code, in accordance with an embodiment.

FIG. 3 is a flow process 300 for automatically instrumenting code, in accordance with an embodiment. The code repository 150 detects 310 code in the code store 155 and determines 320 an extent of change of the detected code. In various embodiments, the code repository 150 analyzes features of the code to determine whether the extent of change warrants the instrumentation of the code. If the code is to be instrumented, the code repository 150 identifies 330 an instrumentation location within the code. An instrumentation location can be, for example, identified as a location in the code that is adjacent to a function call that refers to an external location, such as an external library or directory. The code repository 150 determines 340 elements of information associated with the instrumentation location in the code. Such elements of information can include parameters of function calls at the instrumentation location as well as contextual information that is relevant for the instrumentation location of the code.

The code repository 150 analyzes the elements of information and determines 350 identifiers that represent a subset of the elements of information that are to be logged at the instrumentation location when the code is executed. In various embodiments, the code repository 150 determines identifiers by accessing a relationship map that describes relationships between elements of information that are described in stored datasets in the dataset store 235. The code repository 150 inserts 360 an instrumentation marker at the instrumentation location. Here, the instrumentation marker specifies the determined identifiers. For example, the instrumentation marker can specify the collection of data values corresponding to the determined identifiers when the instrumented code is executed. The code repository 150 stores 370 the instrumented code that includes the inserted instrumentation marker to the code store 155. In various embodiments, the instrumented code can be retrieved and executed by a client device 110. Therefore, data values corresponding to the identifiers specified by the instrumented marker in the instrumented code can be collected when the code is executed and subsequently used to debug and troubleshoot the instrumented code.

Figure 4:
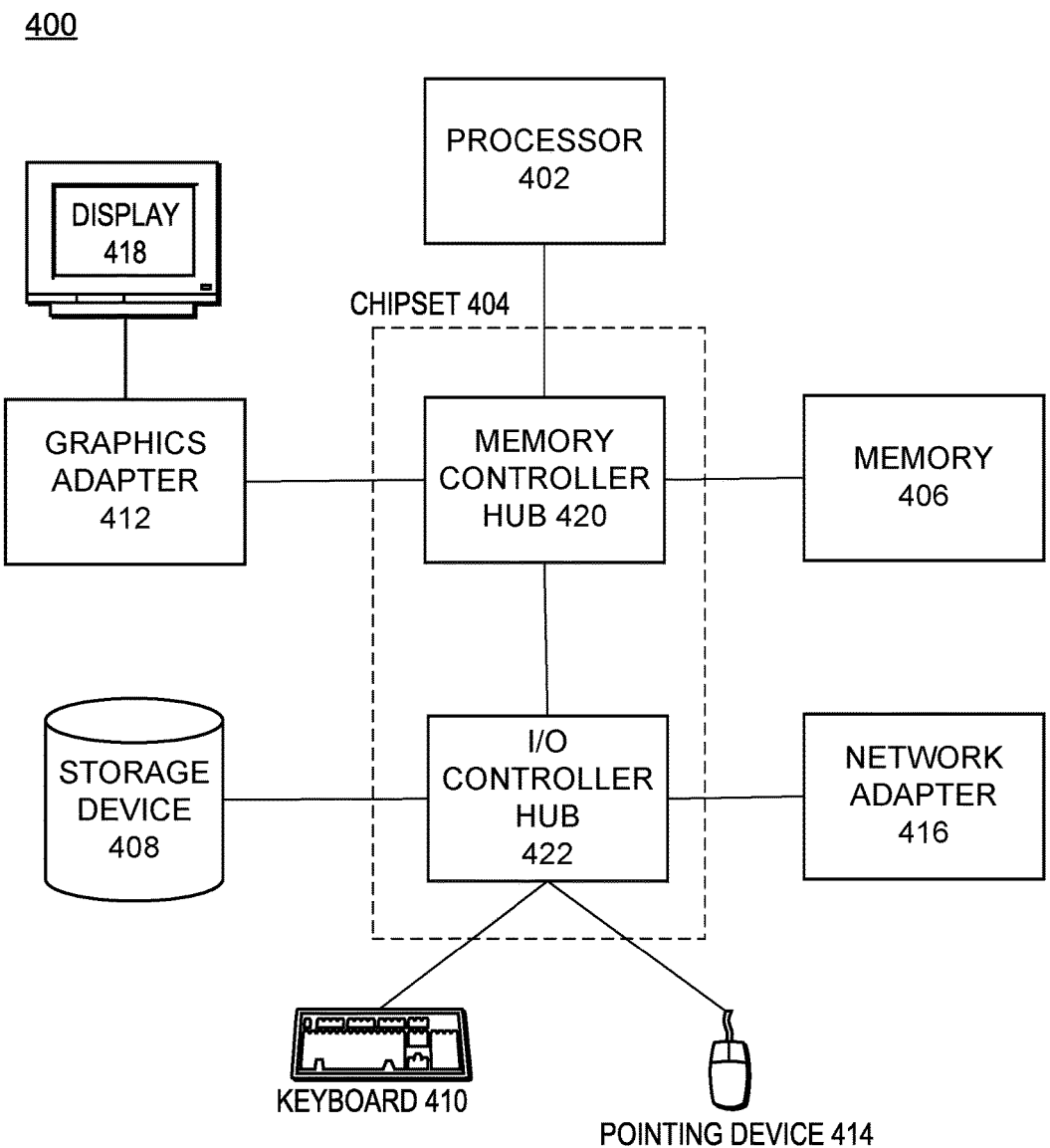
FIG. 4 is a high-level block diagram illustrating physical components of a computer used as part or all of one or more of the entities described herein in one embodiment.

FIG. 4 is a high-level block diagram illustrating physical components of a computer 400 used as part or all of one or more of the entities described herein in one embodiment. For example, instances of the illustrated computer 400 may be a client device 110 used by a developer to generate code that can be stored in the code repository 150. As another example, instances of the illustrated computer 400 may be the code repository 150 that performs the automatic instrumentation of code. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   detecting code stored in a code store;
   identifying an instrumentation location in the code, the instrumentation location representing a location in the code for inserting an instrumentation marker;
   determining elements of information at the instrumentation location in the code;
   determining identifiers to be collected at the instrumentation location, the identifiers representing a subset of the elements of information at the instrumentation location, wherein the determining the identifiers representing the subset of the elements of information comprises:
      identifying an element of information to be potentially collected at the instrumentation location;
      accessing a relationship map in a relationship map store, the relationship map describing relationships between one or more elements of information;
      based on the relationships described in the relationship map, determining whether the element of information to be potentially collected can be derived from another identifier to be collected at another instrumentation location; and
      categorizing the element of information to be potentially collected as an identifier responsive to a determination that the element of information to be potentially collected cannot be derived from another identifier to be collected at another instrumentation location;
   inserting an instrumentation marker at the instrumentation location in the code to produce instrumented code, the instrumentation marker specifying the determined identifiers; and
   storing the instrumented code in the code store.

2. The method of claim 1, wherein the identifying the instrumentation location comprises identifying an external function call in the code, the external function call referencing an external location.

3. The method of claim 2, wherein the elements of information at the instrumentation location comprise parameters of the external function call.

4. The method of claim 1, wherein the determining the identifiers to be collected at the instrumentation location comprises:
   comparing an element of information to one or more other elements to be collected at another instrumentation location in the code;
   determining that the element of information is redundant responsive to the comparing; and
   determining not to categorize the element of information as an identifier responsive to determining that the element of instrumentation is redundant.

5. The method of claim 1, wherein the inserted instrumentation marker in the code causes automatic collection of values associated with the identifiers when the instrumented code is executed.

6. The method of claim 1, further comprising:
   detecting a trigger code feature in the detected code,
   wherein identifying the instrumentation location in the code is performed in response to detecting the trigger code feature in the detected code.

7. A non-transitory computer readable medium comprising code that, when executed by a processor, causes the processor to:
   detect code stored in a code store;
   identify an instrumentation location in the code, the instrumentation location representing a location in the code for inserting an instrumentation marker;
   determine elements of information at the instrumentation location in the code;
   determine identifiers to be collected at the instrumentation location, the identifiers representing a subset of the elements of information at the instrumentation location, wherein the determining the identifiers representing the subset of the elements of information comprises:
      identifying an element of information to be potentially collected at the instrumentation location;
      accessing a relationship map in a relationship map store, the relationship map describing relationships between one or more elements of information;
      based on the relationships described in the relationship map, determining whether the element of information to be potentially collected can be derived from another identifier to be collected at another instrumentation location; and
      categorizing the element of information to be potentially collected as an identifier responsive to a determination that the element of information to be potentially collected cannot be derived from another identifier to be collected at another instrumentation location;
   insert an instrumentation marker at the instrumentation location in the code to produce instrumented code, the instrumentation marker specifying the determined identifiers; and
   store the instrumented code in the code store.

8. The non-transitory computer readable medium of claim 7, wherein the code that causes the processor to identify the instrumentation location further comprises code that, when executed by the processor, causes the processor to identify an external function call in the code, the external function call referencing an external directory or external library.

9. The non-transitory computer readable medium of claim 8, wherein the elements of information at the instrumentation location comprise parameters of the external function call.

10. The non-transitory computer readable medium of claim 7, wherein the code that causes the processor to determine the identifiers to be collected at the instrumentation location further comprises code that, when executed by the processor, causes the processor to:
    compare an element of information to one or more other elements to be collected at another instrumentation location in the code;
    determine that the element of information is redundant responsive to the comparing; and
    determine not to categorize the element of information as an identifier responsive to determining that the element of instrumentation is redundant.

11. The non-transitory computer readable medium of claim 7, wherein the inserted instrumentation marker in the code causes automatic collection of values associated with the identifiers when the instrumented code is executed.

12. The non-transitory computer readable medium of claim 7, further comprising code that, when executed by the processor, causes the processor to:

detect a trigger code feature in the detected code,
wherein identifying the instrumentation location in the code is performed in response to detecting the trigger code feature in the detected code.

13. A method comprising:

detecting code stored in a code store;
determining an extent of change of the detected code by analyzing code features of the code;
performing instrumentation of the detected code based on the determined extent of change, wherein performing the instrumentation of the detected code comprises:
identifying an instrumentation location in the code, the instrumentation location representing a location in the code for inserting an instrumentation marker;
determining elements of information at the instrumentation location in the code;
determining identifiers to be collected at the instrumentation location, the identifiers representing a subset of the elements of information at the instrumentation location, wherein the determining the identifiers representing the subset of the elements of information comprises:
identifying an element of information to be potentially collected at the instrumentation location;
accessing a relationship map in a relationship map store, the relationship map describing relationships between one or more elements of information;
based on the relationships described in the relationship map, determining whether the element of information to be potentially collected can be derived from another identifier to be collected at another instrumentation location; and
categorizing the element of information to be potentially collected as an identifier responsive to a determination that the element of information to be potentially collected cannot be derived from another identifier to be collected at another instrumentation location
inserting an instrumentation marker at the instrumentation location in the code to produce instrumented code, the instrumentation marker specifying the determined identifiers; and
storing the instrumented code in the code store.

14. The method of claim 13, wherein the identifying the instrumentation location comprises identifying an external function call in the code, the external function call referencing an external location.

15. The method of claim 14, wherein the elements of information at the instrumentation location comprise parameters of the external function call.

16. The method of claim 13, wherein the determining the identifiers to be collected at the instrumentation location comprises:

comparing an element of information to one or more other elements to be collected at another instrumentation location in the code;
determining that the element of information is redundant responsive to the comparing; and
determining not to categorize the element of information as an identifier responsive to determining that the element of instrumentation is redundant.

17. The method of claim 13, wherein the inserted instrumentation marker in the code causes automatic collection of values associated with the identifiers when the instrumented code is executed.

18. The method of claim 13, further comprising:

detecting a trigger code feature in the detected code,
wherein the identifying the instrumentation location in the code is performed in response to detecting the trigger code feature in the detected code.

* * * * *